United States Patent
Kohli

(10) Patent No.: US 6,753,279 B2
(45) Date of Patent: Jun. 22, 2004

(54) GLASS COMPOSITION FOR DISPLAY PANELS

(75) Inventor: Jeffrey T. Kohli, Corning, NY (US)

(73) Assignee: Corning Incorporated, Corning, NY (US)

( * ) Notice: Subject to any disclaimer, the term of this patent is extended or adjusted under 35 U.S.C. 154(b) by 114 days.

(21) Appl. No.: 10/016,301

(22) Filed: Oct. 30, 2001

(65) Prior Publication Data

US 2003/0092556 A1 May 15, 2003

(51) Int. Cl.$^7$ .............................................. C03C 3/085
(52) U.S. Cl. .............................. 501/66; 501/67; 501/70; 501/72
(58) Field of Search .............................. 501/66, 67, 70, 501/72

(56) References Cited

U.S. PATENT DOCUMENTS

| | | | | |
|---|---|---|---|---|
| 3,338,696 A | | 8/1967 | Dockerty ..................... | 65/145 |
| 3,682,609 A | | 8/1972 | Dockerty ..................... | 65/83 |
| 3,837,831 A | | 9/1974 | Moore ........................ | 65/134 |
| 4,026,715 A | | 5/1977 | Erickson et al. ............. | 106/50 |
| 4,060,423 A | | 11/1977 | Thomas ....................... | 106/52 |
| 4,409,337 A | | 10/1983 | Dumbaugh, Jr. ............... | 501/66 |
| 4,786,617 A | | 11/1988 | Andrieu et al. ............... | 501/3 |
| 4,824,808 A | | 4/1989 | Dumbaugh, Jr. ............... | 501/66 |
| 4,994,415 A | | 2/1991 | Imai et al. .................. | 501/66 |
| 5,099,173 A | | 3/1992 | Kim et al. ................... | 313/585 |
| 5,116,789 A | | 5/1992 | Dumbaugh, Jr. et al. ........ | 501/66 |
| 5,326,730 A | | 7/1994 | Dumbaugh, Jr. et al. ........ | 501/69 |
| 5,374,595 A | | 12/1994 | Dumbaugh, Jr. et al. ........ | 501/66 |
| 5,459,109 A | | 10/1995 | Lapp ......................... | 501/66 |
| 5,489,558 A | | 2/1996 | Moffatt et al. ............... | 501/69 |
| 5,508,237 A | | 4/1996 | Moffatt et al. ............... | 501/69 |
| 5,599,754 A | | 2/1997 | Maeda et al. ................. | 501/70 |
| 5,618,763 A | | 4/1997 | Frank et al. ................. | 501/5 |
| 5,631,195 A | | 5/1997 | Yanagisawa et al. ........... | 501/72 |
| 5,776,844 A | * | 7/1998 | Koch et al. .................. | 501/70 |
| 5,780,373 A | | 7/1998 | Yanagisawa et al. ........... | 501/72 |
| 5,804,317 A | | 9/1998 | Carrue ....................... | 428/410 |
| 5,851,939 A | | 12/1998 | Miwa ......................... | 501/70 |
| 5,854,153 A | * | 12/1998 | Kohli ........................ | 501/70 |
| 5,888,917 A | | 3/1999 | Kawaguchi et al. ............ | 501/70 |
| 5,889,365 A | | 3/1999 | Tanabe ....................... | 313/582 |
| 5,908,794 A | | 6/1999 | Maeda et al. ................. | 501/70 |
| 5,925,583 A | | 7/1999 | Yoshii et al. ................ | 501/70 |
| 5,932,503 A | | 8/1999 | Kim et al. ................... | 501/70 |
| 6,034,014 A | | 3/2000 | Rapp et al. .................. | 501/35 |
| 6,060,168 A | | 5/2000 | Kohli ........................ | 428/428 |
| 6,063,718 A | | 5/2000 | El Khiati et al. ............. | 501/70 |
| 6,065,309 A | | 5/2000 | Cooper et al. ................ | 65/99.2 |
| 6,087,284 A | | 7/2000 | Brix et al. | |
| 6,251,812 B1 | * | 6/2001 | Koyama et al. ............... | 501/69 |
| 6,268,304 B1 | * | 7/2001 | Maeda et al. ................ | 501/65 |
| 6,297,182 B1 | * | 10/2001 | Maeda et al. ................ | 501/66 |
| 2002/0193233 A1 | * | 12/2002 | Kishimoto et al. ........... | 501/69 |

FOREIGN PATENT DOCUMENTS

| | | | |
|---|---|---|---|
| IT | 714406 | 6/1973 | |
| JP | 09249430 A | * 9/1997 | ........... C03C/3/085 |
| JP | 2001-64028 A | 3/2001 | |
| JP | 2001-64034 A | 3/2001 | |

OTHER PUBLICATIONS

"Glass" by D.C. Boyd and D.A. Thompson, Encyclopedia of Chemical Technology, vol. 11, Third Edition, pp. 807–880 (see pp. 860–863).

* cited by examiner

Primary Examiner—David Sample
(74) Attorney, Agent, or Firm—Adenike A. Adewuya

(57) ABSTRACT

A glass composition suitable for manufacturing plasma displays and large-area displays using the fusion draw process is provided. The glass composition includes 59–66 mol % $SiO_2$, 14.5–18.0 mol % $Al_2O_3$, 8.5–12.0 mol % $Na_2O$, 2.5–6.5 mol % $K_2O$, 2.5–9.0 mol % CaO, 0.0–3.0 mol % MgO, 0.0–3.0 mol % SrO, 0.0–3.0 mol % BaO, and 0.0–5.0 mol % MgO+SrO+BaO.

20 Claims, No Drawings

GLASS COMPOSITION FOR DISPLAY PANELS

BACKGROUND OF INVENTION

1. Field of the Invention

The invention relates to a family of aluminosilicate glasses suitable for fabricating display panels.

2. Background Art

The dominant commercial process for manufacturing flat glass is the float process. In the float process, a stream of molten glass is discharged from a melting furnace into a furnace (or bath) that contains a liquid metal medium. Typically, the metal is tin. The atmosphere in the tin bath is controlled to prevent oxidation of the tin. The molten glass floats and spreads out on the liquid tin in the form of a flat, continuous ribbon. The ribbon of glass is conveyed into an annealing lehr or cooling tunnel, where it is cooled at a controlled rate to ambient temperature. The cooled glass has a flat, smooth surface that requires a minimum of further finishing by processes such as grinding and polishing.

The float process has generally been assumed to be the best method for fabricating large-area display panels, such as plasma display panels. Glasses for plasma display panels have several requirements. One such requirement is that the glass should have a high strain point. In general, a strain point of at least 580° C. is needed to prevent panel distortion during display fabrication. However, it is very difficult to form glasses having high strain points, or glasses whose forming temperatures are very high, in an enclosure containing molten tin. This is because tin has high vapor pressures at temperatures in excess of 1050 to 1100° C. At these high vapor pressures, the molten tin will vaporize and then subsequently condense in colder parts of the float furnace. The condensation may be sufficiently high to create what is referred to as "tin rain"—a situation that should be clearly avoided.

Another method for forming flat glass is known as the fusion draw process, a process developed by Corning Incorporated. The fusion draw process is a down draw process, also referred to as the overflow process. In the fusion draw process, a glass-forming melt flows into a refractory trough and then overflows in a controlled manner from either side of the trough. A key advantage of this process is that the surface of the sheet glass, which is ultimately formed, does not come in contact with any refractory material or other forming equipment. Another benefit of the process is that it yields a very flat and uniformly thick sheet of glass. As a result, no secondary processing is needed to obtain a smooth, flat, and uniform sheet of glass for display applications. The fusion draw process requires glasses exhibiting a relatively high viscosity at the liquidus temperature. Typically, it is desirable to form the glass at viscosities in the range of $10^5$ to $10^6$ poise to obtain optimum flatness and uniform thickness.

A brief description of both the fusion draw and float processes are given in a manuscript entitled "Glass" by D. C. Boyd and D. A. Thompson, Encyclopedia of Chemical Technology, Vol. 11, Third Edition, pp. 807–880 (see pages 860–863). The fusion draw process is also described in U.S. Pat. Nos. 3,338,696 and 3,682,609, both issued to Dockerty.

SUMMARY OF INVENTION

In one aspect, the invention relates to a glass composition which comprises 59–66 mol % $SiO_2$, 14.5–18.0 mol % $Al_2O_3$, 8.5–12.0 mol % $Na_2O$, 2.5–6.5 mol % $K_2O$, 2.5–9.0 mol % CaO, 0.0–3.0 mol % MgO, 0.0–3.0 mol % SrO, 0.0–3.0 mol % BaO, and 0–5 mol % MgO+SrO+BaO.

In another aspect, the invention relates to a glass composition which comprises 59–66 mol % $SiO_2$, 14.5–18.0 mol % $Al_2O_3$, 8.5–12.0 mol % $Na_2O$, 2.5–6.5 mol % $K_2O$, 2.5–9.0 mol % CaO, 0.0–3.0 mol % MgO, 0.0–3.0 mol % SrO, 0.0–3.0 mol % BaO, and 0–5 mol % MgO+SrO+BaO and exhibits a strain point of at least 640° C. and a linear coefficient of thermal expansion of 80 to 95×10$^{-7}$/° C. over a temperature range of 25 to 300° C.

In another aspect, the invention relates to a method of producing a glass panel for an electronic device which comprises melting a glass comprising 59–66 mol % $SiO_2$, 14.5–18.0 mol % $Al_2O_3$, 8.5–12.0 mol % $Na_2O$, 2.5–6.5 mol % $K_2O$, 2.5–9.0 mol % CaO, 0.0–3.0 mol % MgO, 0.0–3.0 mol % SrO, 0.0–3.0 mol % BaO, and 0–5 mol % MgO+SrO+BaO and drawing a thin sheet of molten glass from the melt.

Other features and advantages of the invention will be apparent from the following description and the appended claims.

DETAILED DESCRIPTION

As previously mentioned, glasses for plasma display panels have several requirements. These requirements include, but are not limited to, high coefficient of thermal expansion (CTE), high strain point, low density, high electrical resistivity, chemical durability, and optical clarity. Embodiments of the invention provide glass compositions suitable for fabricating flat panels for plasma displays and other large-area displays using the fusion draw process. Specific embodiments of the invention are described below.

A glass composition range according to an embodiment of the invention includes the following: 59–66 mol % $SiO_2$, 14.5–18.0 mol % $Al_2O_3$, 8.5–12.0 mol % $Na_2O$, 2.5–6.5 mol % $K_2O$, 2.5–9.0 mol % CaO, 0.0–3.0 mol % MgO, 0.0–3.0 mol % SrO, 0.0–3.0 mol % BaO, and 0–5 mol % MgO+SrO+BaO. The glass compositions may also include other components, such as $B_2O_3$, $P_2O_5$, $Li_2O$, $Y_2O_3$, $La_2O_3$, or ZnO. Preferably, these other components do not exceed 5 mol % in total.

To limit alkali mobility, the molar ratio of $Na_2O/K_2O$ is preferably approximately 1.0. However, a molar ratio of 1.2–3.0 is preferred in order to minimize liquidus temperature. The alkalis are used to maintain a high coefficient of thermal expansion (CTE). CaO and MgO limit alkali mobility and flux of the melt at relatively high temperatures while helping to maintain a high strain point. The higher atomic weight cations, such as $Ba^{2+}$ or $La^{3+}$, increase the density of the glass. $B_2O_3$ generally lowers the viscosity of the glass and improves the liquidus temperature. $B_2O_3$ also lowers the strain point and CTE of the glass.

A preferred glass composition range is as follows: 60–65 mol % $SiO_2$, 15.5–17.0 mol % $Al_2O_3$, 9.5–11.0 mol % $Na_2O$, 3.5–5.5 mol % $K_2O$, 3.5–8.0 mol % CaO, 0.0–2.0 mol % MgO, 0.0–2.0 mol % SrO, 0.0–2.0 mol % BaO, and 0–3 mol % MgO+SrO+BaO. The glass compositions may also include other components, such as $B_2O_3$, $P_2O_5$, $Li_2O$, $Y_2O_3$, $La_2O_3$, or ZnO. Preferably, these other components do not exceed 3 mol % in total.

Representative compositions are shown in Tables 1 and 2 below. It should be noted that the examples shown in Tables 1 and 2 are presented for illustration purposes only and are not to be construed as limiting the invention unless as otherwise described herein. For the examples shown in Tables 1 and 2, the glass batches were prepared to yield about 1–5 kg of glass after fusion. The compositions were typically melted at 1600 to 1650° C. for approximately 6 to 16 hours in platinum crucibles. Arsenic oxide may be used as an effective fining agent. The actual batch ingredients may include any material, either oxides or compounds, which, when melted together, with the other batch components, will be converted into the desired oxides in the proper proportions. For example, $SrCO_3$ and $CaCO_3$ can provide the source of SrO and CaO, respectively.

TABLE 1

Glass Compositions and Properties

| | mol % | | | | |
|---|---|---|---|---|---|
| | 1 | 2 | 3 | 4 | 5 |
| $SiO_2$ | 60.5 | 60.5 | 61.0 | 61.5 | 63.0 |
| $Al_2O_3$ | 17.1 | 17.0 | 17.0 | 17.0 | 16.3 |
| $Na_2O$ | 9.9 | 10.0 | 10.4 | 10.7 | 10.3 |
| $K_2O$ | 4.6 | 4.5 | 4.6 | 4.8 | 4.6 |
| MgO | 2.6 | 0.0 | 0.0 | 0.0 | 0.0 |
| CaO | 5.3 | 8.0 | 7.0 | 6.0 | 5.8 |
| Softening Point (° C.) | 942 | 923 | 944 | 944 | 955 |
| Annealing Point | 701 | 693 | 703 | 699 | 699 |
| Strain Point | 651 | 643 | 652 | 647 | 647 |
| CTE ($\times 10^{-7}$/° C.) | 87 | 90 | 91 | 92 | 90 |
| Density (g/cm$^3$) | 2.493 | 2.518 | 2.502 | 2.493 | 2.485 |
| Internal Liquidus (° C.) | 1130 | 1080 | 1075 | 1065 | 1060 |
| Viscosity at the Liquidus (MP) | 0.30 | 0.42 | 0.75 | 1.2 | 1.6 |
| 200 Poise Temp (° C.) | 1668 | 1638 | 1670 | 1695 | 1730 |

TABLE 2

Glass Compositions and Properties

| | mol % | | | | |
|---|---|---|---|---|---|
| | 6 | 7 | 8 | 9 | 10 |
| $SiO_2$ | 64.5 | 64.4 | 63.6 | 60.8 | 60.8 |
| $Al_2O_3$ | 15.7 | 15.6 | 16.4 | 17.0 | 17.0 |
| $Na_2O$ | 9.9 | 10.3 | 10.8 | 10.2 | 10.9 |
| $K_2O$ | 4.4 | 4.0 | 4.2 | 4.6 | 3.9 |
| MgO | 0.0 | 0.0 | 0.0 | 0.0 | 0.0 |
| CaO | 5.6 | 5.7 | 5.0 | 7.5 | 7.5 |
| Softening Point (° C.) | 949 | 931 | 949 | 929 | 952 |
| Annealing Point | 701 | 691 | 701 | 701 | 703 |
| Strain Point | 650 | 640 | 647 | 652 | 655 |
| CTE ($\times 10^{-7}$/° C.) | 88 | 87 | 88 | 87 | 89 |
| Density (g/cm$^3$) | 2.477 | 2.485 | 2.479 | 2.506 | 2.509 |
| Internal Liquidus (° C.) | 1075 | 1080 | 1085 | 1090 | 1020 |
| Viscosity at the Liquidus (MP) | 1.4 | 1.0 | 1.4 | 0.44 | 2.4 |
| 200 Poise Temp (° C.) | 1770 | 1760 | 1770 | 1659 | 1656 |

Tables 1 and 2 also list several chemical and physical properties determined on the glasses in accordance with techniques conventional in the glass art. The softening points were determined by parallel plate viscometry. Annealing and strain points were determined by beam bending viscometry. CTE's were measured using dilatometry on heating from room temperature (25° C.) to 300° C. The reported liquidus temperatures are the highest temperature at which a crystal was observed within a glass specimen, not at an interface between air and glass or glass and platinum. The liquidus temperature was measured via the standard liquidus method, which involved placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass.

Among all the glass compositions shown in Tables 1 and 2, glass composition 10 in Table 2 has the most suitable combination of physical properties, liquidus, and 200 Poise temperature (representing a melting temperature). All the compositions listed, except for glass composition 1 in Table 1, have liquidus values less than 1100° C., have viscosities at the liquidus in excess of 400 kP, and are suited for sheet formation using the fusion draw process. The compositions listed have CTEs in a range from 87–92×10$^{-7}$/° C. In general, the CTE may range from 80–95×10$^{-7}$/° C.

While the invention has been described with respect to a limited number of embodiments, those skilled in the art, having benefit of this disclosure, will appreciate that other embodiments can be devised which do not depart from the scope of the invention as disclosed herein. The scope of the invention is defined by the attached claims.

What is claimed is:

1. A glass composition comprising 59–66 mol % $SiO_2$, 14.5–18.0 mol % $Al_2O_3$, 8.5–12.0 mol % $Na_2O$, 2.5–6.5 mol % $K_2O$, 2.5–9.0 mol % CaO, 0.0–3.0 mol % MgO, 0.0–3.0 mol % SrO, 0.0–3.0 mol % BaO, 0.0–5.0 mol % MgO+SrO+BaO, and 0.0–0.45 mol % $B_2O_3$, the glass composition having a linear coefficient of thermal expansion of 80 to 95×10$^{-7}$/° C. over a temperature range of 25 to 300° C.

2. The glass composition of claim 1 having a liquidus temperature of 1100° C. or less.

3. The glass composition of claim 1 having a viscosity at a liquidus temperature of at least 10$^5$ poise.

4. The glass composition of claim 1 having a viscosity at a liquidus temperature in excess of 4×10$^5$ poise.

5. The glass composition of claim 1 having a linear coefficient of thermal expansion of 87 to 92×10$^{-7}$/° C. over a temperature range of 25 to 300° C.

6. The glass composition of claim 1 having a strain point greater than 580° C.

7. The glass composition of claim 6 having a strain point of at least 640° C.

8. The glass composition of claim 1 further comprising at least one oxide selected from the group consisting of $P_2O_5$, $Li_2O$, $Y_2O_3$, $La_2O_3$, and ZnO in a total amount not exceeding 5 mol %.

9. The glass composition of claim 1 wherein a molar ratio of $Na_2O$ to $K_2O$ is approximately 1.0.

10. The glass composition of 1 claim wherein a molar ratio of $Na_2O$ to $K_2O$ is in a range from 1.2 to 3.0.

11. The glass composition of claim 1 comprising 60–65 mol % $SiO_2$, 15.5–17.0 mol % $Al_2O_3$, 9.5–11.0 mol % $Na_2O$, 3.5–5.5 mol % $K_2O$, 3.5–8.0 mol % CaO, 0.0–2.0 mol % MgO, 0.0–2.0 mol % SrO, 0.0–2.0 mol % BaO, and 0.0–3.0 mol % MgO+SrO+BaO.

12. The glass composition of claim 1 further comprising at least one oxide selected from the group consisting of $P_2O_5$, $Li_2O$, $Y_2O_3$, $La_2O_3$, and ZnO in a total amount not exceeding 3 mol %.

13. A glass composition comprising 59–66 mol % $SiO_2$, 15.0–18.0 % $Al_2O_3$, 8.5–12.0 mol % $Na_2O$, 2.5–6.5 mol % $K_2O$ 2.5–9.0 mol % CaO, 0.0–3.0 mol % MgO, 0.0–3.0 mol % SrO, 0.0–3.0 mol % BaO, and 0.0–0.45 mol % $B_2O_3$, the glass composition exhibiting a linear coefficient of thermal expansion of 80 to 95×10$^{-7}$/° C. over a temperature range of 25 to 300° C.

14. The glass composition of claim 13, wherein MgO+SrO+BaO are present in a total amount of 0–5 mol %.

15. The glass composition of claim 13, comprising 60–65 mol % $SiO_2$, 15.5–17.0 mol % $Al_2O_3$, 9.5–11.0 mol %

$Na_2O$, 3.5–5.5 mol % $K_2O$, 3.5–8.0 mol % CaO, 0.0–2.0 mol % MgO, 0.0–2.0 mol % SrO, and 0.0–2.0 mol % BaO.

16. The glass composition of claim 15, wherein MgO+SrO+BaO are present in a total amount of 0–3 mol %.

17. A glass substrate for an electronic display device, comprising 59–66 mol % $SiO_2$, 15.0–18.0 mol % $Al_2O_3$, 8.5–12.0 mol % $Na_2O$, 2.5–6.5 mol % $K_2O$, 2.5–9.0 mol % CaO, 0.0–3.0 mol % MgO, 0.0–3.0 mol % SrO, 0.0–3.0 mol % BaO, 0.0–5.0 mol % MgO+SrO+BaO, and 0.0–0.45 mol % $B_2O_3$, the glass composition exhibiting a linear coefficient of thermal expansion of 80 to $95 \times 10^{-7}/°$ C. over a temperature range of 25 to 300° C.

18. A glass substrate for an electronic display device, comprising:
a flat, transparent glass exhibiting a strain point of at least 640° C. and a linear coefficient of thermal expansion of 80 to $95 \times 10^{-7}/°$ C. over a temperature range of 25 to 300C., the glass comprising 59–66 mol % $SiO_2$, 14.5–18.0 mol % $Al_2O_3$, 8.5–12.0 mol % $Na_2O$, 2.5–6.5 mol % $K_2O$, 2.5–9.0 mol % CaO, 0.0–3.0 mol % MgO, 0.0–0.3 mol % SrO, 0.0–3.0 mol % BaO, 0.0–5.0 mol % MgO+SrO+BaO, and 0.0–0.45 mol % $B_2O_3$.

19. A method of producing a glass panel for an electronic device, comprising:
melting a glass batch comprising 59–66 mol % $SiO_2$, 15.0–18.0 mol % $Al_{23}$, 8.5–12.0 mol % $Na_2O$, 2.5–6.5 mol % $K_2O$, 2.5–9.0 mol % CaO, 0.0–3.0 mol % MgO, 0.0–3.0 mol % SrO, 0.0–3.0 mol % BaO, 0.0–5.0 mol % MgO+SrO+BaO, and 0.0–0.45 mol % $B_2O_3$; and
drawing a thin sheet of molten glass from the melt, the thin sheet exhibiting a linear coefficient of thermal expansion of 80 to $95 \times 10^{-7}/°$ C. over a temperature range of 25 to 300° C.

20. The method of claim 19, wherein the glass sheet is drawn by the fusion draw process.

* * * * *